(12) United States Patent  
Chen

(10) Patent No.: US 8,121,406 B2
(45) Date of Patent: Feb. 21, 2012

(54) PREFERENCE COLOR ADJUSTING SYSTEM AND METHOD BASED ON ADJUSTMENT COEFFICIENT PAIRS FROM HUE LOOKUP TABLES

(75) Inventor: Yen-Lin Chen, Sindian (TW)

(73) Assignee: Sunplus Technology Co., Ltd. (TW)

( * ) Notice: Subject to any disclaimer, the term of this patent is extended or adjusted under 35 U.S.C. 154(b) by 949 days.

(21) Appl. No.: 12/122,684

(22) Filed: May 17, 2008

(65) Prior Publication Data
US 2008/0285852 A1   Nov. 20, 2008

(30) Foreign Application Priority Data

May 17, 2007   (TW) ............................... 96117587 A

(51) Int. Cl.
*G06K 9/36*   (2006.01)

(52) U.S. Cl. ........... 382/167; 347/43; 347/100; 358/1.9; 358/518; 358/520

(58) Field of Classification Search .................. 382/162, 382/167; 347/43, 100; 358/1.9, 518, 520
See application file for complete search history.

(56) References Cited

U.S. PATENT DOCUMENTS

| 5,818,613 | A  | * | 10/1998 | Masterson et al. ............ 358/520 |
| 2004/0120576 | A1 | * | 6/2004 | Kim ............................... 382/167 |
| 2005/0062756 | A1 | * | 3/2005 | Dyke et al. ..................... 345/604 |
| 2006/0087591 | A1 |   | 4/2006 | Chen et al. |
| 2006/0120598 | A1 | * | 6/2006 | Takahashi et al. ............ 382/167 |
| 2007/0223067 | A1 | * | 9/2007 | Lee et al. ...................... 358/520 |

* cited by examiner

*Primary Examiner* — Vikkram Bali
*Assistant Examiner* — Eueng-Nan Yeh
(74) *Attorney, Agent, or Firm* — Lowe Hauptman Ham & Berner, LLP

(57) ABSTRACT

A preference color adjusting system includes a saturation calculator, a hue calculator, a first lookup table device, a second lookup table device, a mixer, and a UV converter. The saturation calculator receives an RGB pixel and produces a saturation of the pixel. The hue calculator receives the RGB pixel and produces a hue of the pixel. The first lookup table device stores plural first adjustment coefficient pairs for outputting a first adjustment coefficient pair according to the hue. The second lookup table device stores plural second adjustment coefficient pairs for outputting a second adjustment coefficient pair according to the hue. The mixer performs a weighting operation on the first and second adjustment coefficient pairs according to the saturation to thereby output an output coefficient pair. The UV converter adjusts U and V values of a YUV pixel corresponding to the RGB pixel according to the output coefficient pair.

21 Claims, 5 Drawing Sheets

PREFERENCE COLOR ADJUSTING SYSTEM AND METHOD BASED ON ADJUSTMENT COEFFICIENT PAIRS FROM HUE LOOKUP TABLES

RELATED APPLICATIONS

The present application is based on, and claims priority from, Taiwanese Application Number 096117587, filed May 17, 2007, the disclosure of which is hereby incorporated by reference herein in its entirety.

BACKGROUND OF THE INVENTION

1. Field of the Invention

The present invention relates to the technical field of color processing and, more particularly, to a preference color adjusting system and method.

2. Description of Related Art

Digital cameras, video cameras, displays, color printers, LCD TVs are substantially in widespread use in the global market and getting mature. Accordingly, the quality enhancement is further pursued. The quality and effectiveness of image system can be critically influenced by the color technique.

A user typically hopes to see the correct image colors in an image multimedia device, so the input or output device needs to properly reproduce the image colors. Namely, what is seen is reproduced. Further, since different color combinations result in different feelings to people, the user may expect a color representation to meet the preference after the proper colors are met, which is referred to as a preference color. Accordingly, a user adjusting device capable of providing the color representation is given, such that the image device can reproduce the preference color, for example a bluer sky or greener grass.

However, during a color phase and chrominance adjustment, the typical color processing technique cannot respectively adjust the color phase or the chrominance for the colors. To overcome this problem, the U.S. Patent Application Publication US 20060087591 discloses a processing system to adjust in-phase signal I and quadrature signal Q according to various phase information. As shown in FIG. 1, the system includes a phase differentiator 102, a delay 106, a hue table 104, a rotating stage 110, a gain stage 112 and a saturation table 108. The I and Q signals of a chrominance signal are input to the phase differentiator 102 for accordingly calculating a color phase for output to the hue table 104. The hue table 104 finds an angle of rotation by looking up the internal table based on the color phase. The rotating stage 110 receives the angle of rotation and calculates cos( ) and sin( ) parts corresponding to the angle of rotation, thereby performing a rotation operation on the I and Q signals and further adjusting hue and saturation of the chrominance signal.

FIG. 2 is a block diagram of the rotating stage 110. As shown in FIG. 2, the rotating stage 110 includes a calculating engine to calculate the cos( ) and sin( ) parts and a rotator to perform the rotation operation on the I and Q signals and accordingly obtaining I' and Q' signals. However, in a practical circuit, the calculating engine for cos( ) and sin( ) calculation requires numerous logic gates and massively consumes the power. In addition, such a system cannot adjust the hues or chrominance for the colors respectively.

Therefore, it is desirable to provide an improved system and method to mitigate and/or obviate the aforementioned problems.

SUMMARY OF THE INVENTION

An object of the present invention is to provide a preference color adjusting system and method, which can adjust the chrominance of various color ranges and provide a preferred use convenience.

Another object of the present invention is to provide a preference color adjusting system and method, which can adjust the chrominance of various color ranges, without using the calculating engine for cos( ) and sin( ) calculation, and save the cost and avoid the heavy power consumption.

According to a feature of the invention, a preference color adjusting system is provided. The system includes a saturation calculator, a hue calculator, a first lookup table device, a second lookup table device and a mixer. The saturation calculator receives an RGB pixel and produces a saturation of the RGB pixel. The hue calculator receives the RGB pixel and produces a hue of the RGB pixel. The first lookup table device is connected to the hue calculator and stores a plurality of first adjustment coefficient pairs for outputting a first adjustment coefficient pair according the hue of the RGB pixel. The second lookup table device is connected to the hue calculator and stores a plurality of second adjustment coefficient pairs for outputting a second adjustment coefficient pair according to the hue of the RGB pixel. The mixer is connected to the saturation calculator, the first lookup table device and the second lookup table device in order to perform a weighting operation on the first and second adjustment coefficient pairs according to the saturation of the RGB pixel to thereby output an output coefficient pair.

According to another feature of the invention, a preference color adjusting method is provided. The method includes a saturation calculating step, which receives an RGB pixel and produces a saturation of the RGB pixel; a hue calculating step, which receives the RGB pixel and produces a hue of the RGB pixel; a first table lookup step, which performs a table lookup operation on a first lookup table device according to the hue of the RGB pixel and accordingly outputs a first adjustment coefficient pair, wherein the first lookup table device stores a plurality of first adjustment coefficient pairs; a second table lookup step, which performs a table lookup operation on a second lookup table device according to the hue of the RGB pixel and accordingly outputs a second adjustment coefficient pair, wherein the second lookup table device stores a plurality of second adjustment coefficient pairs; and a mixing step, which performs a weighting operation on the first and second adjustment coefficient pairs according to the saturation of the RGB pixel to thereby output an output coefficient pair.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
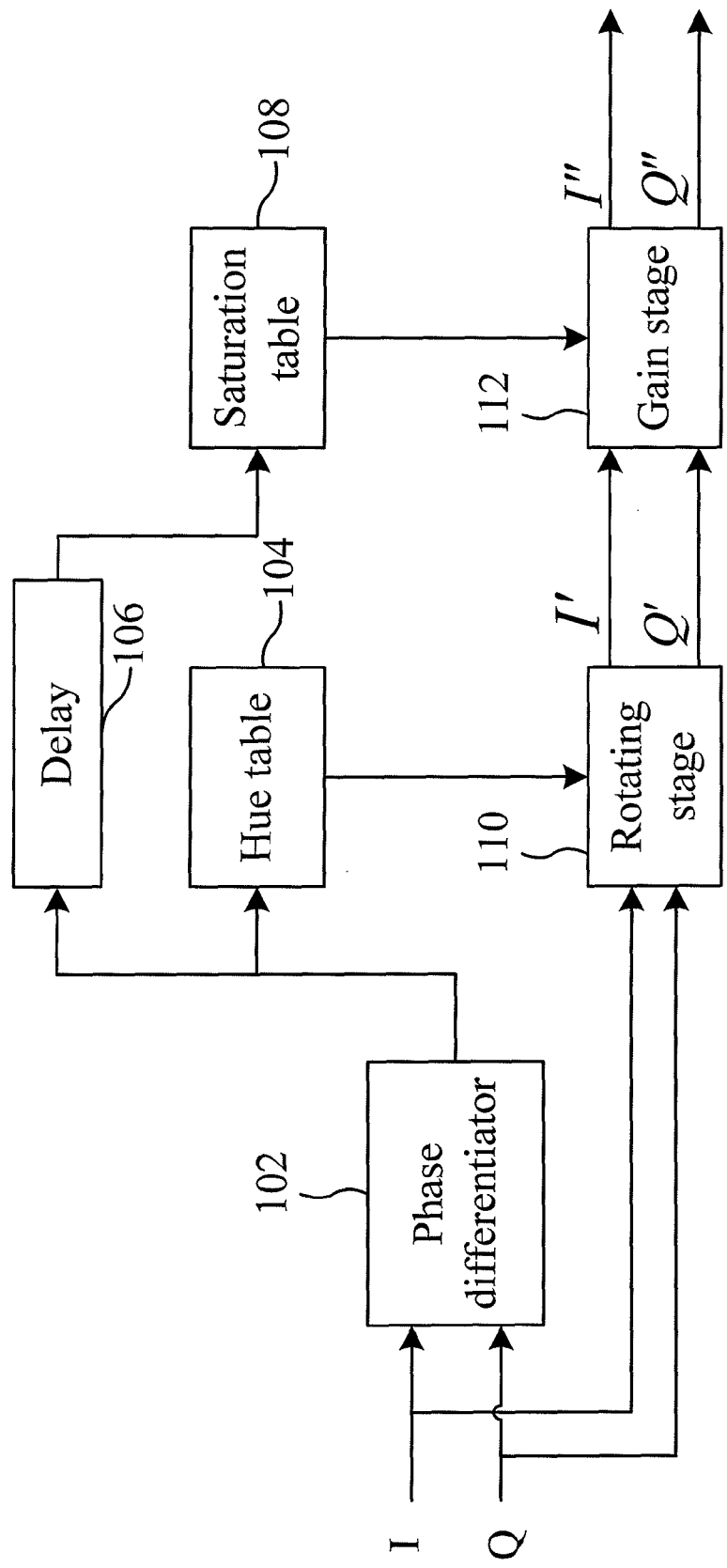
FIG. 1 is a block diagram of a system for color image processing in the prior art.
Figure 2:
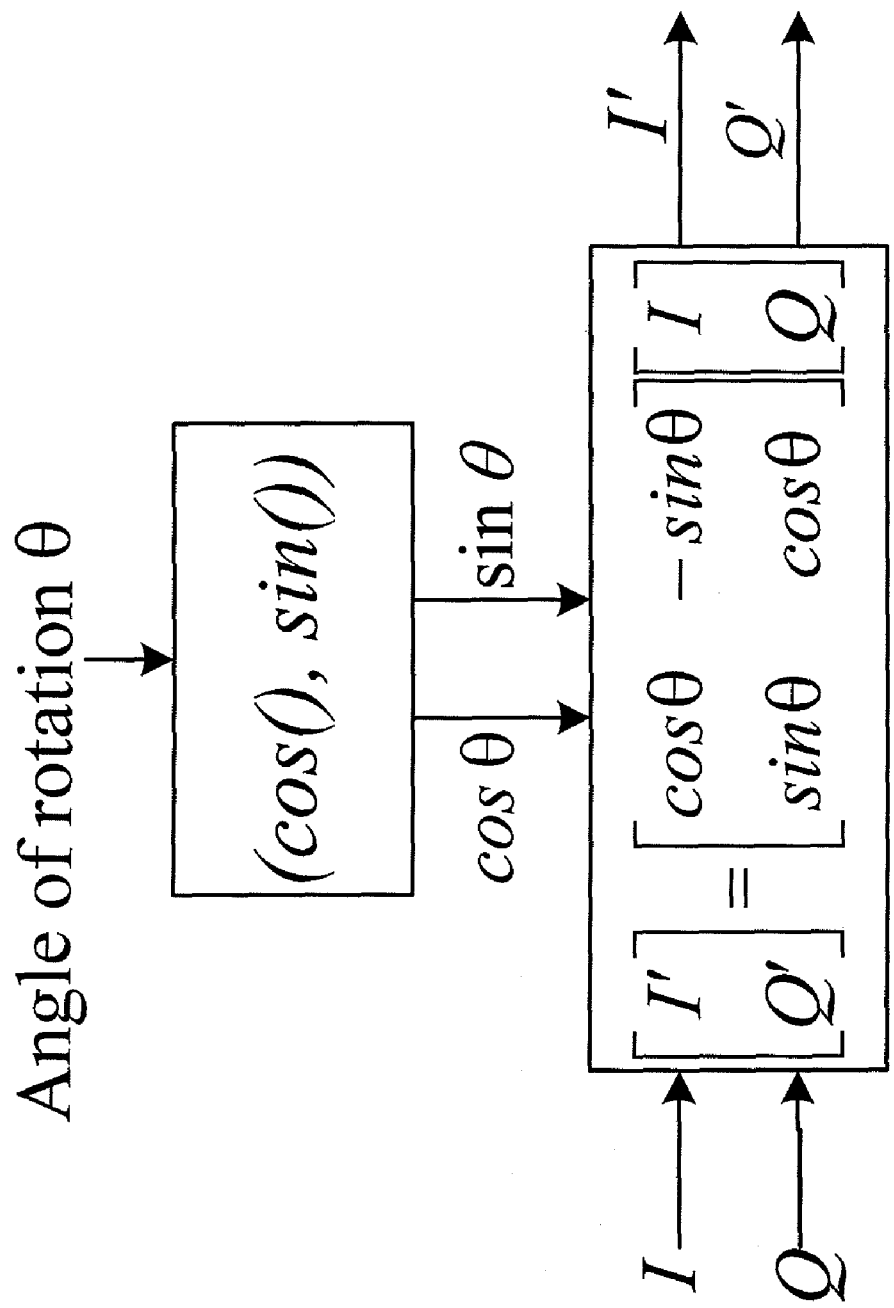
FIG. 2 is a block diagram of a rotating stage of FIG. 1.
Figure 3:
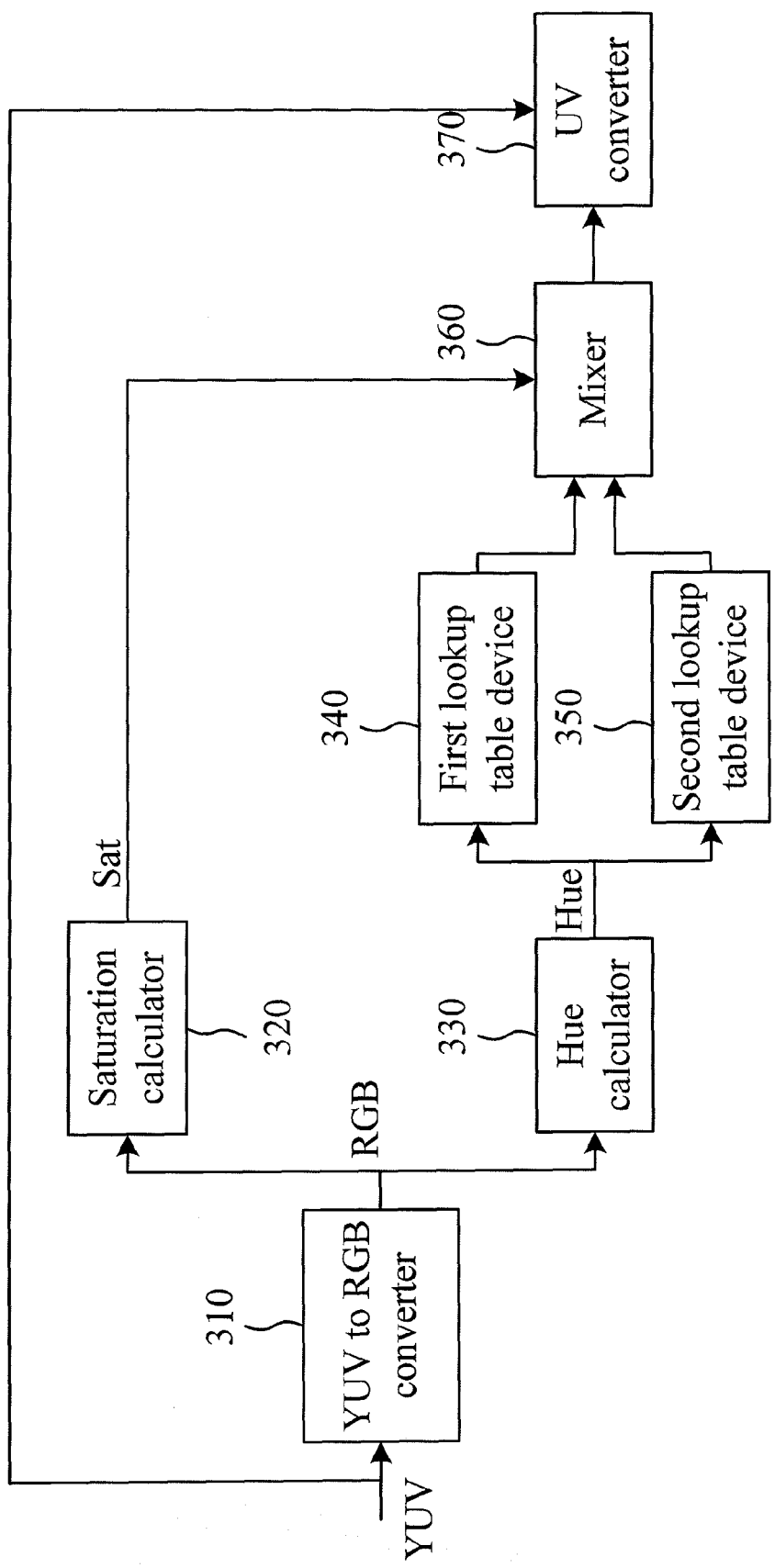
FIG. 3 is a block diagram of an embodiment of a preference color adjusting system according to the invention.

FIG. 3 is a block diagram of an embodiment of a preference color adjusting system in accordance with the invention. As shown in FIG. 3, the preference color adjusting system includes a saturation calculator 320, a hue calculator 330, a first lookup table device 330, a second lookup table device 340, a mixer 360, a YUV to RGB converter 310 and a UV converter 370.

The YUV to RGB converter 310 converts a YUV pixel into an RGB pixel through an equation as follows:

$$R = Y + 1.371 \times V$$

$$G = Y - 0.336U - 0.698V$$

$$B = Y + 1.732U.$$

The YUV to RGB converter 310 can be implemented by a hardware description language (HDL).

The saturation calculator 320 receives the RGB pixel and produces a saturation Sat of the RGB pixel. The saturation Sat of the RGB pixel can be expressed as fix{[1−3*min(R, G, B)/(R+G+B)]*255} where R, G and B respectively indicate red, green and blue values of the RGB pixel, min( ) indicates a minimum function, and fix indicates a ceiling function, for $0 \leq \text{Sat} \leq 255$. Namely, in this embodiment, the saturation Sat is represented in eight bits. However, in other embodiments, the saturation Sat can have more bits to enhance the sharpness, depending on the design of the choice.

The hue calculator 330 receives the RGB pixel and produces a hue of the RGB pixel. The hue of the RGB pixel can be expressed as:

$$\text{Hue} = \begin{cases} \theta, & B \leq G \\ 360 - \theta, & B > G \end{cases}$$

where $\theta = \cos^{-1}\{0.5*[(R-G)+(R-B)]/[(R-G)^2+(R-B)(G-B)]^{1/2}\}$, and R, G and B respectively indicates red, green and blue values of the RGB pixel, for $0 \leq \text{Hue} \leq 359$.

The first lookup table device 340 is connected to the hue calculator 330. The first lookup table device 340 stores a plurality of first adjustment coefficient pairs for outputting a first adjustment coefficient pair table1_value according to the hue. The first adjustment coefficient pair table1_value is produced upon a first predetermined saturation and a first predetermined hue.

Figure 4:
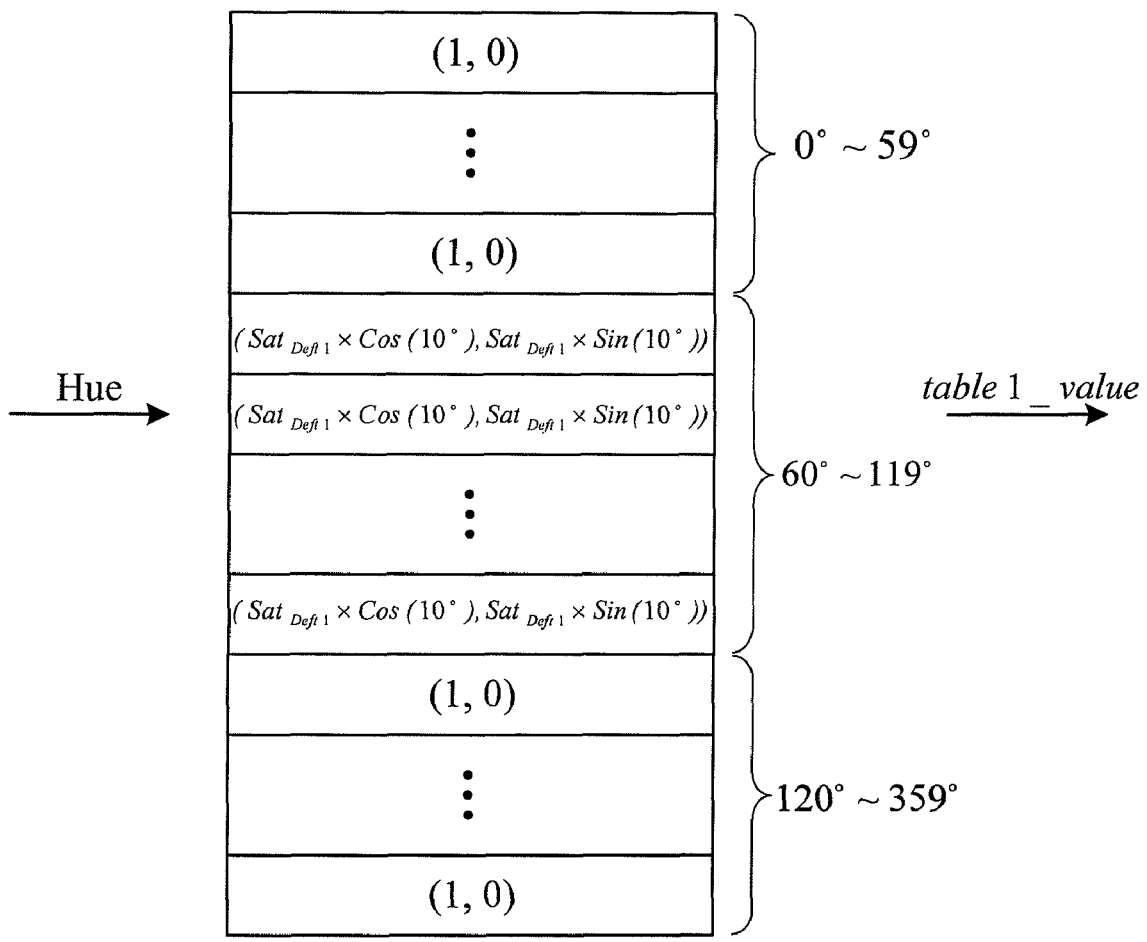
FIG. 4 is a schematic diagram of a stored content in a first lookup table device of FIG. 3 according to the invention.

FIG. 4 is a schematic diagram of a stored content in the first lookup table device 340. As shown in FIG. 4, when the hue is in the first range (0°~59°) or the third range (120°~359°), the first adjustment coefficient pair table1_value is a value of (1, 0) to indicate that the output equals to the input and no adjustment is performed. When the hue is in the second range (60°~119°), the first adjustment coefficient pair table1_value is produced upon the first predetermined saturation $\text{Sat}_{Deft1}$ and the first predetermined hue. Take 10° for example. Namely, the first adjustment coefficient pair table1_value is a value of ($\text{Sat}_{Deft1} \times \cos(10°), \text{Sat}_{Deft1} \times \sin(10°)$). The first lookup table device 340 to finds the corresponding first adjustment coefficient pair table1_value as the output according to the hue functions as an index.

The second lookup table device 350 is connected to the hue calculator 330. The second lookup table device 350 stores a plurality of second adjustment coefficient pairs for outputting a second adjustment coefficient pair table2_value according to the hue. The second adjustment coefficient pair table2_value is produced upon a second predetermined saturation and a second predetermined hue.

Similarly, when the hue is in the fourth range (0°~119°) or the sixth range (240°~359°), the second adjustment coefficient pair table2_value is a value of (1, 0) to indicate that the output equals to the input and no adjustment is performed. When the hue is in the fifth range (120°~239°), the second adjustment coefficient pair table2_value is produced upon the second predetermined saturation $\text{Sat}_{Deft2}$ and the second predetermined hue. Take 10 for example. Namely, the second adjustment coefficient pair table2_value is a value of ($\text{Sat}_{Deft2} \times \cos(10°), \text{Sat}_{Deft2} \times \sin(10°)$). The second lookup table device 340 to accordingly find the second adjustment coefficient pair table2_value as the output according to the hue functions as an index.

The stored content in the two lookup table devices 340 and 350 are similar and described only for description, i.e., the first predetermined saturation $\text{Sat}_{Deft1}$, the first predetermined hue, the second predetermined saturation $\text{Sat}_{Deft2}$, the second predetermined hue and the first to sixth ranges are given for convenient description, not for limitation, which can be adjusted depending on the requirement.

The mixer 360 is connected to the saturation calculator 320, the first lookup table device 340 and the second lookup table device 350 in order to perform a weighting operation on the first adjustment coefficient pair table1_value and the second adjustment coefficient pair table2_value according to the saturation Sat and output an output coefficient pair.

When the saturation Sat of the RGB pixel is smaller than a third predetermined saturation, the output coefficient pair is the first adjustment coefficient pair table1_value. When the saturation Sat of the RGB pixel is greater than a fourth predetermined saturation, the output coefficient pair is the second adjustment coefficient pair table2_value. When the saturation Sat of the RGB pixel is a value locating in a range from the third to the fourth predetermined saturation, the output coefficient pair is:

$$\alpha \times \text{table1\_value} + (1-\alpha) \times \text{table2\_value},$$

where table1_value indicates the first adjustment coefficient pair, table2_value indicates the second adjustment coefficient pair, and $0 \leq \alpha \leq 1$.

The UV converter 370 is connected to the mixer 360 in order to adjust U and V values of the YUV pixel according to the output coefficient pair, which can be expressed as:

$$\begin{bmatrix} U_{out} \\ V_{out} \end{bmatrix} = \begin{bmatrix} a1 & a2 \\ -a2 & a1 \end{bmatrix} \begin{bmatrix} U \\ V \end{bmatrix},$$

where a1 and a2 respectively indicate coefficients of the output coefficient pair, and U and V respectively indicate U and V values of the YUV pixel.

Figure 5:
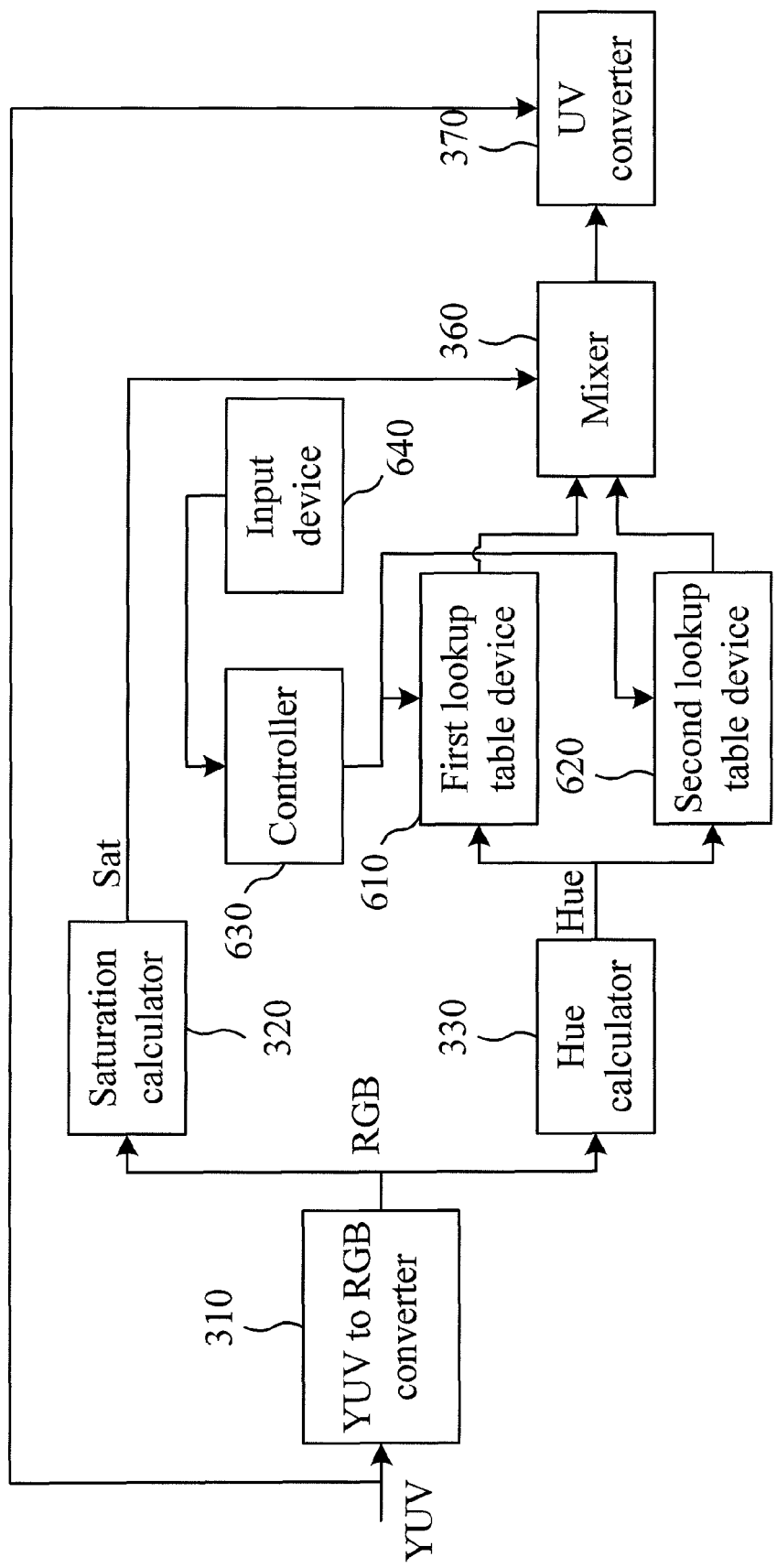
FIG. 5 is a block diagram of another embodiment of a preference color adjusting system according to the invention.

FIG. 5 is a block diagram of another embodiment of a preference color adjusting system according to the invention. As compared to FIG. 3, the preference color adjusting system in FIG. 5 adds a controller 630 and an input device 640, and implements the first lookup table device 610 and the second lookup table device 620 as a programmable device. The first lookup table device 610 and the second lookup table device 620 can be a flash, SRAM or DRAM.

When the parameters associated with the first predetermined saturation $\text{Sat}_{Deft1}$, the first predetermined hue, the second predetermined saturation $\text{Sat}_{Deft2}$, the second predetermined hue and the first to sixth ranges are selected through the input device 640 by a user, the controller 630 computes the content respectively corresponding to the first lookup table device 610 and the second lookup table device 620 according to the parameters selected by the user, and writes it to the first lookup table device 610 and the second lookup table device 620 respectively.

As cited, the invention uses the saturation calculator 320, the hue calculator 330, the first lookup table device 340, the second lookup table device 350 and the mixer 360 to adjust the U and V signals for various color ranges. Thus, the colors are adjusted. In addition, the calculated color phases and chrominance can define the color of each pixel, and further the first lookup table device and the second lookup table device are used to adjust the U and V signals for various color ranges to thereby find the preference color. The invention defines the amount of color phase and chrominance changes according to the color phase values of different pixels and the amount of color phase and chrominance changes according to the chrominance values of different pixels. Namely, the amount of color phase and chrominance changes is defined by both the color phase and chrominance values of the pixels. Thus, the adjustment of color ranges is more accurate.

Although the present invention has been explained in relation to its preferred embodiment, it is to be understood that many other possible modifications and variations can be made without departing from the spirit and scope of the invention as hereinafter claimed.

What is claimed is:

1. A preference color adjusting system implemented in an image multimedia device that has a processor programmed to control the system, said system comprising:
   a saturation calculator, which receives an RGB pixel and produces a saturation of the RGB pixel;
   a hue calculator, which receives the RGB pixel and produces a hue of the RGB pixel;
   a first lookup table device, which is connected to the hue calculator in order to output a first adjustment coefficient pair according to the hue of the RGB pixel, wherein the first lookup table device stores a plurality of first adjustment coefficient pairs;
   a second lookup table device, which is connected to the hue calculator in order to output a second adjustment coefficient pair according to the hue of the RGB pixel, wherein the second lookup table device stores a plurality of second adjustment coefficient pairs; and
   a mixer, which is connected to the saturation calculator, the first lookup table device and the second lookup table device in order to perform a weighting operation on the first adjustment coefficient pair and the second adjustment coefficient pair according to the saturation of the RGB pixel to thereby output an output coefficient pair.

2. The system as claimed in claim 1, further comprising a YUV to RGB converter, which is connected to the saturation calculator and the hue calculator in order to convert a YUV pixel into the RGB pixel.

3. The system as claimed in claim 2, further comprising a UV converter, which is connected to the mixer in order to adjust U and V values of the YUV pixel according to the output coefficient pair.

4. The system as claimed in claim 3, wherein the output coefficient pair is set to the first adjustment coefficient pair when the saturation of the RGB pixel is smaller than a third predetermined saturation.

5. The system as claimed in claim 4, wherein the output coefficient pair is set to the second adjustment coefficient pair when the saturation of the RGB pixel is greater than a fourth predetermined saturation.

6. The system as claimed in claim 5, wherein, when the saturation of the RGB pixel is greater than the third predetermined saturation and smaller than the fourth predetermined saturation, the output coefficient pair is defined as:

$$\alpha \times \text{table1\_value} + (1-\alpha) \times \text{table2\_value},$$

where table1_value indicates the first adjustment coefficient pair, table2_value indicates the second adjustment coefficient pair, and $0 \leq \alpha \leq 1$.

7. The system as claimed in claim 1, wherein the saturation of the RGB pixel is expressed as:

$$\text{Sat} = \text{fix}\{[1 - 3 \times \min(R,G,B)/(R+G+B)] \times 255\},$$

where R, G and B respectively indicate red, green and blue values of the RGB pixel, min( ) indicates a minimum function, fix indicates a ceiling function, and Sat indicates the saturation of the RGB pixel.

8. The system as claimed in claim 1, wherein the hue of the RGB pixel is expressed as:

$$\text{Hue} = \begin{cases} \theta, & B \leq G \\ 360 - \theta, & B > G \end{cases},$$

where $\theta = \cos^{-1}\{0.5 \times [(R-G)+(R-B)]/[(R-G)^2+(R-B)(G-B)]^{1/2}\}$, and R, G and B respectively indicate red, green and blue values of the RGB pixel and Hue indicates the hue of the RGB pixel.

9. The system as claimed in claim 1, wherein the first lookup table device is a programmable device and the first adjustment coefficient pair is produced upon a first predetermined saturation and a first predetermined hue from the programmable device.

10. The system as claimed in claim 1, wherein the second lookup table device is a programmable device and the second adjustment coefficient pair is produced upon a second predetermined saturation and a second predetermined hue from the programmable device.

11. A preference color adjusting method, comprising the steps:
    a saturation calculating step, which receives an RGB pixel and produces a saturation of the RGB pixel;
    a hue calculating step, which receives the RGB pixel and produces a hue of the RGB pixel;
    a first table lookup step, which performs a table lookup operation on a first lookup table device according to the hue of the RGB pixel and accordingly outputs a first adjustment coefficient pair, wherein the first lookup table device stores a plurality of first adjustment coefficient pairs;
    a second table lookup step, which performs a table lookup operation on a second lookup table device according to the hue of the RGB pixel and accordingly outputs a second adjustment coefficient pair, wherein the second lookup table device stores a plurality of second adjustment coefficient pairs; and
    a mixing step, which performs a weighting operation on the first adjustment coefficient pair and the second adjustment coefficient pair according to the saturation of the RGB pixel to thereby output an output coefficient pair.

12. The method as claimed in claim 11, further comprising a YUV to RGB converting step, which converts a YUV pixel into the RGB pixel.

13. The method as claimed in claim 12, further comprising a UV converting step, which adjusts U and V values of the YUV pixel according to the output coefficient pair.

14. The method as claimed in claim 13, wherein the output coefficient pair is set to the first adjustment coefficient pair when the saturation of the RGB pixel is smaller than a third predetermined saturation.

15. The method as claimed in claim 14, wherein the output coefficient pair is set to the second adjustment coefficient pair when the saturation of the RGB pixel is greater than a fourth predetermined saturation.

16. The method as claimed in claim 15, wherein, when the saturation of the RGB pixel is greater than the third predetermined saturation and smaller than the fourth predetermined saturation, the output coefficient pair is defined as:

$$\alpha \times table1\_value + (1-\alpha) \times table2\_value,$$

where table1_value indicates the first adjustment coefficient pair, table2_value indicates the second adjustment coefficient pair, and $0 \leq \alpha \leq 1$.

17. The method as claimed in claim 11, wherein the saturation of the RGB pixel in the saturation calculating step is produced by:

$$Sat = fix\{[1 - 3*min(R,G,B)/(R+G+B)]*255\},$$

where R, G and B respectively indicate red, green and blue values of the RGB pixel, min( ) indicates a minimum function, fix indicates a ceiling function, and Sat indicates the saturation of the RGB pixel.

18. The method as claimed in claim 11, wherein the hue of the RGB pixel in the hue calculating step is produced by:

$$Hue = \begin{cases} \theta, & B \leq G \\ 360 - \theta, & B > G \end{cases},$$

where $\theta = \cos^{-1}\{0.5*[(R-G)+(R-B)]/[(R-G)^2+(R-B)(G-B)]^{1/2}\}$, and R, G and B respectively indicate red, green and blue values of the RGB pixel and Hue indicates the hue of the RGB pixel.

19. The method as claimed in claim 11, wherein the first lookup table device in the first table lookup step is a programmable device and the first adjustment coefficient pair is produced upon a first predetermined saturation and a first predetermined hue from the programmable device.

20. The method as claimed in claim 11, wherein the second lookup table device in the second table lookup step is a programmable device and the second adjustment coefficient pair is produced upon a second predetermined saturation and a second predetermined hue from the programmable device.

21. A preference color adjusting system implemented in an image multimedia device that has a processor programmed to control the system, said system comprising:
a saturation calculator, which receives an RGB pixel and produces a saturation of the RGB pixel;
a hue calculator, which receives the RGB pixel and produces a hue of the RGB pixel;
a first lookup table device, which is connected to the hue calculator in order to output a first adjustment coefficient pair according to the hue of the RGB pixel, wherein the first lookup table device stores a plurality of first adjustment coefficient pairs;
a second lookup table device, which is connected to the hue calculator in order to output a second adjustment coefficient pair according to the hue of the RGB pixel, wherein the second lookup table device stores a plurality of second adjustment coefficient pairs;
a mixer, which is connected to the saturation calculator, the first lookup table device and the second lookup table device in order to perform a weighting operation on the first adjustment coefficient pair and the second adjustment coefficient pair according to the saturation of the RGB pixel to thereby output an output coefficient pair;
a controller, which is connected to the first lookup table device and the second lookup table device in order to configure the first lookup table device and the second lookup table device; and
an input device, which is connected to the controller in order to input parameters;
wherein the controller computes the first adjustment coefficient pairs and second adjustment coefficient pairs respectively corresponding to the first lookup table device and the second lookup table device according to the parameters inputted by the input device, and the controller writes the first adjustment coefficient pairs and second adjustment coefficient pairs to the first lookup table device and the second lookup table device respectively.

* * * * *